United States Patent
Ajmeer et al.

(10) Patent No.: US 12,120,766 B2
(45) Date of Patent: Oct. 15, 2024

(54) OPERATION APPARATUS AND METHOD FOR MAINTAINING NETWORK CONNECTIVITY OF A NETWORK DEVICE BASED ON SELF-RELATED CONNECTION INFORMATION OBTAINED FROM MONITORING MAINTENANCE MESSAGES

(71) Applicant: SIGNIFY HOLDING B.V., Eindhoven (NL)

(72) Inventors: Ahamed Rafik Ajmeer, Eindhoven (NL); Sathya Phaneendra Reddy Gadi, Eindhoven (NL); Manoj Ayyankotil Kulangara, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 365 days.

(21) Appl. No.: 17/768,394

(22) PCT Filed: Oct. 16, 2020

(86) PCT No.: PCT/EP2020/079145
§ 371 (c)(1),
(2) Date: Apr. 12, 2022

(87) PCT Pub. No.: WO2021/074355
PCT Pub. Date: Apr. 22, 2021

(65) Prior Publication Data
US 2023/0254927 A1  Aug. 10, 2023

(30) Foreign Application Priority Data

Oct. 17, 2019 (IN) .............................. 201941041974
Dec. 3, 2019 (EP) ..................................... 19213254

(51) Int. Cl.
*H04W 24/00* (2009.01)
*H04W 24/04* (2009.01)
(Continued)

(52) U.S. Cl.
CPC ........... *H04W 76/19* (2018.02); *H04W 24/04* (2013.01); *H04W 40/246* (2013.01)

(58) Field of Classification Search
None
See application file for complete search history.

(56) References Cited

U.S. PATENT DOCUMENTS

| 9,231,823 | B2 | 1/2016 | van Greunen et al. |
| 2014/0211608 | A1 | 7/2014 | Fan |

FOREIGN PATENT DOCUMENTS

| CN | 107864486 A | 3/2018 |
| JP | 2018506920 A | 3/2018 |
| WO | 2016032379 A1 | 3/2016 |

OTHER PUBLICATIONS

CISCO; Meraki "Troubleshooting Mesh Communication Between Access Points", Undated, pp. 1-9.
(Continued)

*Primary Examiner* — Abdelillah Elmejjarmi

(57) ABSTRACT

It is an object of the present invention to provide an apparatus that allows for improving the self-healing capability of a network, wherein the apparatus is adapted to be part of a network (100), like a ZigBee network. The operation apparatus (110) is adapted to operate a network device (101) and comprises a network information providing unit (111), wherein the network information refers to information with respect to maintenance messages (105, 106, 107) sent and/or received by a network device (101) and/or a neighboring network device (103, 104) to maintain the network, a determination unit (112) for determining self-related connection information from the network information, wherein (Continued)

the self-related connection information refers to information on the connection of the network device itself with the network, and a control unit (113) for controlling the network device based on the self-related connection information.

18 Claims, 3 Drawing Sheets

(51) Int. Cl.
*H04W 40/24* (2009.01)
*H04W 76/19* (2018.01)

(56) References Cited

OTHER PUBLICATIONS

DIGI; XBee/XBee-PRO S2C Zigbee RF Module; Undated, pp. 1-84.
Texas Instruments; Z-Stack Developer's Guide, SWRA 176 Version 1.10; 2006-2011, pp. 1-34.

OPERATION APPARATUS AND METHOD FOR MAINTAINING NETWORK CONNECTIVITY OF A NETWORK DEVICE BASED ON SELF-RELATED CONNECTION INFORMATION OBTAINED FROM MONITORING MAINTENANCE MESSAGES

CROSS-REFERENCE TO PRIOR APPLICATIONS

This application is the U.S. National Phase application under 35 U.S.C. § 371 of International Application No. PCT/EP2020/079145, filed on Oct. 16, 2020, which claims the benefits of European Patent Application No. 19213254.6, filed on Dec. 3, 2019 and Indian Patent Application No. 201941041974, filed on Oct. 17, 2019. These applications are hereby incorporated by reference herein.

FIELD OF THE INVENTION

The invention relates to an apparatus, a method and a computer program for operating a network device adapted to be part of a network comprising a plurality of network devices. Further, the invention relates to a network device adapted to being part of the network of a plurality of network devices and comprising the apparatus, and a network comprising a plurality of the network devices comprising the apparatus.

BACKGROUND OF THE INVENTION

Today, in many applications, for instance, in smart home applications, devices like lighting devices are adapted to participate in a network with other devices. These networks allow the devices to communicate not only with neighboring devices, i.e. devices in the same area as the device, but also with far away members of the network, wherein the devices in between the communicating members of the network are used as transfer stations for the communication. Since such networks are mostly decentrally organized, if one network member drops out of the network, i.e. quits communicating with the other members of the network, most networks are able to reroute communication between their members to compensate for the missing member. This capability of decentrally organized networks to cope with the failure of members of the network is called self-healing capability of the network. In the context of a self-healing network, most devices are adapted to notice if a neighboring device, i.e. a neighboring member, of the network has dropped out of the network and cannot be used for communication purposes any more. However, in such cases it is still necessary that a user of the network is notified that a device has dropped out of the network to manually reset the dropped out device such that it can again participate in the network. This can be quite cumbersome for the user and it would thus be desirable to provide a network device that improves the self-healing capability of a network.

SUMMARY OF THE INVENTION

It is an object of the present invention to provide an apparatus, a network device, a network comprising the network device, a method and a computer program that allow for improving the self-healing capability of a network.

In a first aspect of the invention an operation apparatus for operating a network device adapted to being part of a network comprising a plurality of network devices is presented, wherein the operation apparatus comprises a) a network information providing unit for providing network information, wherein the network information refers to information with respect to maintenance messages sent and/or received by the network device and/or a neighboring network device of the network device to maintain the network, wherein the neighboring network device is part of the same network as the network device, b) a determination unit for determining self-related connection information from the network information, wherein the self-related connection information refers to information on the connection of the network device itself with the network, and c) a control unit for controlling the network device based on the self-related connection information.

Since the determination unit is adapted to determine self-related connection information from the network information, wherein the self-related connection information refers to information on the connection of the network device itself with the network, a network device that is still powered on can determine for itself whether it is still connected to the network or if there is a risk of losing the connection to the network directly. Moreover, since the control unit is adapted to control the network device based on the self-related connection information, the control unit can initiate measures as soon as the self-related connection information indicates that a problem with the connection of the network device with the network arises. In such a case, the control unit can, for instance, initiate a reset of the network connection, increase the power for network transmissions of the network device, etc., to prevent the disconnection from the network or to reconnect the network device to the network. Thus, the self-healing capabilities of the network comprising such network devices can be improved.

The operation apparatus is adapted for operating a network device. In particular, the operation apparatus can be adapted to control the network device, for instance, by sending control messages to the network device that influence provided functions of the network device. The operation apparatus can be arranged as part of the network device as hardware or software, for instance, can be provided in the same housing as a network device. Alternatively, the operation apparatus can be independent of the network device and can be provided, for instance, in its own housing, wherein in this case the operation apparatus can be connected directly via wire or wirelessly with the network device for communicating with the network device.

The network device can be any kind of device that is adapted to being part of a network of a plurality of other network devices having the same or different functions than the network device. Preferably, the network device is a stationary network device, i.e. a network device that is, during its normal application, stationed at a constant location. The network device is preferably a stationary smart network device, i.e. a device comprising in addition to its at least one or more specific functions a network capability. In particular, the stationary smart network device does not refer to a general computation device for general application or a portable general computing device, like a smart phone. The network device can be, for instance, adapted to be part of a smart home network application and provide functions in this context. For example, the network device can be a sensor device for monitoring temperature, pressure, humidity, etc., an entertainment device like a loudspeaker, a monitor, etc., an ambience control device, like a temperature control device, a humidity control device, a lighting control device, etc. Preferably, the network device is a lighting device comprising at least a lighting unit for providing light to its environment. Further, it is preferred that the network device is adapted to being connected to a lighting network comprising a plurality of lighting devices, wherein the network can also comprise additional network devices like sensor devices. Moreover, it is preferred that the network device is adapted to connect to, i.e. being part of, a Zigbee network using the Zigbee protocol for communication. Additionally, or alternatively, the network device can be adapted to connect to, i.e. being part of, a Star Sense wireless network. Generally, the network can be any network with a synchronization, i.e. maintenance, mechanism to maintain the network or determine the status, for instance, health status, of the network. The network can be part of applications like home control applications, automation applications, industrial application, security application, power metering applications, etc.

The network information providing unit is adapted for providing network information. The network information providing unit can be a storing unit on which the network information is stored already and from which the network information can be retrieved. The network information providing unit can also be a retrieving unit for retrieving the network information, for instance, from a transmitting unit that is adapted to communicate with the network by sending and receiving data, wherein the network information providing unit is then adapted to determine network information from this data, for instance, by identifying information related to the network from the sent and received data. Moreover, the network information unit can also be a receiving unit and can then, for instance, comprise the transmitting unit.

The network information refers to information with respect to the network to which the network device is connected. A connection to a network can comprise at least one connection to a network device being part of the network, but can also comprise a connection with a plurality of other network devices being part of the network. The connections between the network devices can be wired or wireless connections. In particular, a network device can be considered as being part of a network if the network device is able to send and receive signals for other members of the network and further is known by at least one other member as being able to send and receive signals from other network devices.

The network information comprises information with respect to maintenance messages sent by the network device and/or a neighboring network device of the network device to maintain the network. Generally, most network communication protocols include the transmitting of maintenance messages in regular time intervals that allow each network device being part of the network to determine which other network devices are in a reasonable communication distance and could be regarded as also being part of the network. Thus, these maintenance messages are important for keeping the network of devices alive. The network information can comprise, for instance, information with respect to a timing of sent or received maintenance messages, information with respect to the content of the maintenance messages, information with respect to the quality of the sent or received maintenance messages, or information with respect to any other characteristic in connection with the sending and receiving of the maintenance messages. The information can relate to maintenance messages sent and/or received by the network device itself and/or by a neighboring network device.

A neighboring network device refers to a network device that is also part of the same network as the network device and also is part of a network neighborhood of the network device. A network neighborhood can be defined, for instance, by the used communication protocol or can be defined through a spatial distance between the network devices. In an example, the neighborhood of a network device can be defined as consisting of all network devices from which the network device receives maintenance messages. In other examples, the neighborhood of the network device can be defined as incorporating all network devices in a predefined spatial vicinity around the network device, or can be defined based on a given structure of the network, like a given hierarchical order of the network, wherein the neighborhood of a network device can then refer only to network devices from which the network device receives a maintenance message and that are further in the same and/or a neighboring hierarchical order as the network device.

The determination unit is adapted to determine self-related connection information from the network information. The self-related connection information refers to information on the connection of the network device itself with the network. For instance, if the network information comprises timing information of the sending and receiving of the maintenance messages from the network device and/or a neighboring network device, the determination unit can be adapted to determine as self-related connection information that part of the timing information that relates to the network device itself, for example, the timing of the maintenance messages sent or received by the network device itself. In another example, if the network information comprises information on a neighborhood of devices of a neighboring network device of the network device, the determination unit can determine, as self-related connection information, information from this neighborhood information relating to the network device itself, for instance, the information whether the network device is considered as being part of a neighborhood of the neighboring network device or not. Thus, the self-related connection information only relates to information with a clear relationship to the network device itself. In particular, the self-related connection information does not comprise connection information with respect to other network devices, like neighboring network devices. For instance, the self-related connection information does not comprise information on whether another network device is part of the neighborhood of the network device or a neighboring network device or whether another network device has sent maintenance messages to the network device.

The control unit is adapted for controlling the network device based on the self-related connection information. In particular, since the self-related connection information provides information that refers to the connection of the network device itself with the network, it is possible to determine whether the network device that is operated by the operation apparatus is still part of the network or runs a risk to disconnect from the network. For instance, if the self-related connection information comprises information on the timing of the sending of maintenance messages of the network device itself to its neighboring network devices, the control unit can be adapted to determine that the network device has missed sending the maintenance messages for a predetermined time period and thus might run a risk of dropping out of the neighborhood of the neighboring network devices and thus of disconnecting from the network. Preferably, the control unit is adapted to control the network device such that measures are taken to maintain or regain the connection of the network device to the network if it is determined that a network device has disconnected from the network or runs a risk of disconnecting from the network. Such measures can be, for instance, the resetting of the network device, the resetting of the network connection of the network device, a power-down or power-up of the network device, the increasing of a signal intensity or a bandwidth of the transmissions of the network device, a rearrangement of the structure of the network neighborhood of the network device, etc. Thus, it becomes possible for a network device itself comprising the operation apparatus to get information on the status of its own connection with the network and to prevent dropping out of the network completely, such that an overall self-healing capability of the network is improved.

In an embodiment, the self-related connection information determined from the network information comprises information indicative of a timing of maintenance messages sent by the network device itself. The information indicative of the timing of maintenance messages sent by the network device itself can be, for instance, information on when the last maintenance messages have been sent, like a time when the last maintenance messages have been sent, information on whether the last maintenance messages have been sent according to a schedule if the network protocol used by the network device to communicate with the network predefines a schedule from the maintenance messages, information on the time span between the last sent maintenance messages, etc. Thus, the network information in this case comprises information on whether and how the network device itself has contributed to maintaining a network connection to the network. If it can be determined from the network information, for instance, that the network device itself has not sent maintenance messages as indicated by a maintenance message schedule of the network protocol used in the network, this can indicate that there might be some failure in the software or hardware of the network device that allows the network device to recognize that it is part of a network and to maintain the network connection. Thus, in this embodiment the control unit can be adapted to control the network device such that measures are taken to restart or to maintain sending maintenance messages, for instance, based on the schedule of the network protocol, for instance, if it is determined that a network device has quit sending maintenance messages or has not sent maintenance messages on a regular basis.

In a preferred embodiment, the self-related connection information determined from the network information comprises a time span since the last maintenance message has been sent by the network device itself, wherein the control unit is adapted to compare the determined time span with a predetermined threshold and to control the network device based on the result of the comparison. The time span since the last maintenance message has been sent by the network device itself can be determined, for instance, by comparing a time stamp of the last maintenance message with the current time, or, by providing a clock counting the time after the sending of a maintenance message until the sending of the next maintenance message. The predetermined threshold with which the time span is compared can be, for instance, a threshold determined based on a maintenance message schedule of the network protocol used by the network device. In this case, the threshold can, for instance, refer to three times a time between the scheduled sending of maintenance messages. If the network protocol used is a Zigbee network protocol, the threshold can be, for instance, 5 minutes if the Zigbee maintenance status schedule indicates to send a maintenance message every 15 to 30 seconds. However, the threshold can also be lower or higher. The control unit is then adapted to control the network device based on the result of the comparison. In particular, the control unit can be adapted to control the network device to take measures for reconnecting or maintaining the connection to the network if the result of the comparison shows that the determined time span is above the predetermined threshold.

In an embodiment, the network information comprises neighborhood information indicative of a network neighborhood of a neighboring network device being part of the network neighborhood of the network device, wherein the determination unit is adapted to determine self-related connection information from the neighborhood information. As already explained above, a network neighborhood can be defined, for instance, by the used communication protocol or can be defined through a spatial distance between the network device and the neighboring network devices. The neighborhood information of the neighboring network device can, for instance, be provided as part of the maintenance messages sent by each network device or can be provided to the network device after having received a request from the network device. Moreover, the neighborhood information can be sent in predetermined intervals as part of the maintenance messages together, for instance, with other maintenance information. The neighborhood information can comprise identifiers, like identification numbers, for all network devices regarded as being part of the neighborhood of the neighboring network device. Instead of identification numbers, the neighborhood information can also comprise other identifiers identifying each network device that is regarded as being part of the neighborhood of the neighboring network device, for instance, locations of the network devices, names given to the network devices, for instance, by the user, specific functions of the network devices in the network, the position of the network device in a hierarchical structure of the network, etc. Moreover, the neighborhood information can comprise more information on the network devices considered part of the neighborhood than an identifier. For example, the neighborhood information can comprise, in addition to the identifier, data indicative of a connection quality with a network device, information on the status of the connection of a network device, information on the place of a network device in the structural hierarchy of the network, information on connection characteristics of the network device, like a connection bandwidth, a communication protocol used, etc.

The determination unit is then adapted to determine one or more self-related connection information from the neighborhood information, i.e. is adapted to extract the information from the neighborhood information that relates to the network device itself. For example, the determination unit can be adapted to extract the identifier of the network device, the communication protocol used by the network device, the quality of the connection between the network device and the neighboring network device, and other information related to the network device itself from the neighborhood information as self-related connection information. The control unit can then be adapted, for instance, to determine based on the self-related connection information containing self-related neighborhood information if it is necessary to control the network device to take measures to ensure that it is recognized as being part of the neighborhood of the neighboring network device to maintain the connection with the network.

In a preferred embodiment, the determination unit is adapted to determine from the neighborhood information an indication whether the network device is known by the neighboring network device to belong to the neighborhood of the neighboring network device as self-related connection information. The determination unit can be adapted, for instance, to determine whether the network device is known by the neighboring network device as belonging to the neighborhood of the neighboring network device, by searching for an identifier of the network device in the neighborhood information provided by the neighboring network device. If the neighborhood information of a neighboring network device does not comprise the identifier of the network device itself, the network unit can be adapted to determine that the network device is not known by the neighboring network device as belonging to the neighborhood of the neighboring network device. If the determination unit determines that the identifier of the network device itself is provided as part of the neighborhood information of the neighboring network device, the determination unit can be adapted to determine that the network device is known by the neighboring network device as belonging to the neighborhood of the neighboring network device. The control unit can then be adapted to control the network device based on the self-related connection information comprising the information whether the network device itself is known by the neighboring network device as belonging to the neighborhood of the neighboring network device to control the network device. Additionally, the determination unit can be adapted to further determine, from the neighborhood information of another neighboring network device belonging to the neighborhood of the network device, whether the network device is known by the other neighboring network device in order to validate the information received from the earlier neighboring network device. For instance, if the network device is not known by a neighboring network device, the determination unit can be adapted to validate whether the network device is known by another neighboring network device in the neighborhood, and based on the outcome, the control unit can be adapted to control the network device to take measures to inform the neighboring network device of the presence of the network device to maintain the network connection between the network device and the neighboring network device. Moreover, the control unit can also be adapted to take measures to maintain the network connection if it is determined that the network device is not known by one of the neighboring network devices, or by a predetermined number of neighboring network devices.

In an embodiment, the neighborhood information comprises connection quality data being indicative of a quality of a network connection between two network devices, wherein the determination unit is adapted to determine self-related connection information from the connection quality data. The connection quality data is indicative of a quality of a network connection between two network devices, for instance, the connection quality data can refer to a quality value. The quality value can be indicative of a received signal strength, for instance, can be a received signal strength indicator (RSSI), of a latency of the communication signals, of a packet transmission delay, of a number of communication packets losses or sending retries, of a signal to noise ratio, of a passive acknowledgement which is used during a rebroadcast, etc. The self-related connection information refers to information from the connection quality data in relation with the network device itself. For instance, the self-related connection information determined from the connection quality data can refer to the quality of the connection between the network device and the neighboring network device as perceived by the neighboring network device. The self-related connection information determined from the connection quality data can also refer to a quality of the data sent by the network device and received by the neighboring network device. The control unit can then be adapted to control the network device based on the connection quality data. In an embodiment, the control unit can be adapted to control the network device to take measures for maintaining a connection with or reconnecting to a neighboring network device if the information from the connection quality data indicates that the connection quality is below a predetermined threshold.

In an embodiment, the determination unit is adapted to determine self-related connection information from the neighborhood information of a randomly chosen neighboring network device. For instance, if a network device receives, as part of the maintenance messages, neighborhood information of a plurality of neighboring network devices on a regular basis, the determination unit can be adapted to randomly choose a neighboring network device and to determine the self-related connection information from the neighboring information of the randomly chosen neighboring network device. This embodiment allows to ensure that, over time, the neighborhood information from each of the neighboring network devices is used for determining the self-related connecting information and thus to check the connection of the network device with each of the neighboring network devices in time. After having determined the self-related connection information from the neighborhood information of the randomly chosen neighboring network device, the determination unit can be adapted to further determine more self-related connection information from the neighborhood information from another neighborhood network device, in particular another randomly chosen neighborhood network device.

In a preferred embodiment, if the determination unit determines from the neighborhood information of the randomly chosen neighborhood network device that the identifier of the network device is known to the neighboring network device, the determination unit can be adapted to further determine connection quality data from the neighborhood information of the randomly chosen neighboring network device. For instance, the determination unit can be adapted to check whether the quality of the connection of the network device with the neighborhood network device is within acceptable limits. If this is the case, the determination unit can be adapted to choose the next neighborhood information of the next randomly chosen neighborhood network device for determining these parameters until either all neighborhood information of the available neighboring network devices is processed or until one of the neighborhood information indicates a failure of the connection of the network device to one of the neighboring network devices, wherein the determination unit can then be adapted to provide this information as self-related connection information to the control unit.

In a preferred embodiment, the neighborhood information comprises a neighborhood table that contains identifiers of all network devices considered to be part of the neighborhood of the network device sending the neighborhood table. Preferably, the neighborhood table comprises further network related parameters related to the network devices considered to be part of the neighborhood of the network device sending the neighborhood table. The further network related parameters preferably comprise connection quality data.

In an embodiment, the control unit is adapted to control the network device to take measures for reconnecting to the network or for maintaining a connection to the network if the self-related connection information indicates that the connection of the network device to the network is failing. The connection of the network device with the network can be determined as failing if the connection of the network device to one or more of its neighboring network devices is failing. The failing can also comprise a complete loss of the connection to the network or to one or more neighboring network devices. Preferably, a failing of the connection to the network is indicated when more than one connection to a neighboring network device is lost or indicates a loss in the near future. The failure of a connection with a neighboring network device can be indicated, for instance, by a combination of one or more of the above given examples for the self-related connection information. For instance, a failure of a connection to a neighboring network device can be indicated by a loss of connection quality, the determination that the network device is not part of the neighborhood table of one or more neighboring network devices, and/or the quitting of sending maintenance massages by the network device itself. Based on a structure of the network, for instance, the hierarchical order of the network, the control unit can then be adapted to determine that the connection of the network device is failing based on one or more failing connections to neighboring network devices.

Preferably, the control unit is adapted to control the network device to reset itself if the self-related connection information indicates that the connection of the network device to the network is failing. The resetting of the network device can comprise, for instance, a power-down and a power-up of the network device, a power-down and a power-up of parts of the network device, the resetting of the communication with the network, for instance, by sending a reconnection message to the network, performing a channel or network scan, etc. Additionally or alternatively, the control unit can be adapted to take other measures for reconnecting to the network or maintaining the connection to the network, for instance, by increasing the power for sending communication or maintenance messages, determine a more suitable communication channel, for example, based on the noise on different communication channels, etc.

Alternatively, or additionally, in one embodiment, the control unit is adapted to control the network device to provide an information to a user and/or other network devices that a connection to the network is failing if the self-related connection information indicates that the connection of the network device is failing. Since the information on the failing network connection of the network device is provided to a user or other network devices, it becomes possible for the user or for the other network devices to react accordingly to the missing network connection of the network device. For instance, if a reset of the network device does still not allow the network device to reconnect to the network or to maintain a stable connection to the network, the control unit can be adapted to provide this information to a user such that the user can intervene, for instance, by replacing the network device or by repairing the network device. Moreover, since the other network devices are informed by the network device that the connection of the network device to the network, for instance, to at least one of the neighboring devices, is failing, the other network devices can react to this information. For example, the other network devices can start to plan communication routes not including the failing network device, can rearrange the structure and/or hierarchical order of the network to compensate for the missing network device, can provide reconnection signals to the network device, and/or can increase the communication power with which communication signals are sent to the network device. Thus, since the failing network device itself is aware of the possible or impending failure and since the network device communicates this failure, if possible, directly to other network devices, the information of the failure might be available to the network long before the actual failure of the network device. Thus, measures to prevent or, if this is not possible, to cope with the failing network device are directly available to the network, hence, further improving the self-healing capabilities of the network.

In a preferred embodiment, the network is a Zigbee network and the network device is adapted to be part of the Zigbee network. Alternatively, the network can be a Star Sense network and the network device can be adapted to be a part of a Star Sense network. Moreover, the network can be based on any other wireless network protocol that follows a network topology, i.e. a network structure, using regular maintenance messages, like beacon messages, to maintain the network or to determine the structure and health of a network.

In another aspect of the present invention, a network device adapted to being part of a network of a plurality of network devices is presented, wherein the network device comprises an operation apparatus according to the above described embodiments for operating the network device. Preferably, the network device is a smart network device being, for instance, part of a home control application, automation application, industrial automation application, security application, power metering application, etc., wherein the network device does not refer to a generic computer device or to a portable computer device, like a smart phone. In a preferred embodiment, the network device comprises lighting capabilities, for instance, refers to a smart lighting device.

In another aspect of the present invention, a network is presented, wherein the network comprises a network device according to the above described embodiments. Preferably, the network is based on a Zigbee network communication protocol. Alternatively, the network can be based on a Star Sense wireless communication protocol or any other wireless network protocol utilizing knowledge on a mesh topology, i.e. network structure. In particular, the network comprises at least one network device as explained above and a plurality of other network devices that can also refer to a network device as described above, i.e. comprising an operation apparatus, with the same or other functionalities as the network device, and can also comprise additional network devices without the operation apparatus. Preferably, the network comprises more than two network devices as described above and might further comprise additional network devices with limited network capabilities, for instance, sensor devices that can only send information to the network.

In another aspect of the present invention, an operation method for operating a network device adapted to being part of a network comprising a plurality of network devices is presented, wherein the operation method comprises a) providing network information, wherein the network information comprises information with respect to maintenance messages sent by the network device and/or a neighboring network device of the network device to maintain the network, wherein the neighboring network device is part of the same network as the network device, b) determining self-related connection information from the network information, wherein the self-related connection information refers to information on the connection of the network device itself with the network, c) controlling the network device based on the self-related connection information.

In another aspect of the present invention, a computer program for operating a network device is presented, wherein the computer program comprises program code means for causing the operation apparatus as described above to carry out the steps of the operation method as also described above when the computer program is executed by the apparatus.

It shall be understood that the control module of claim 1, the method of claim 14 and the computer program of claim 15 have similar and/or identical preferred embodiments, in particular, as defined in the dependent claims.

It shall be understood that a preferred embodiment of the present invention can also be any combination of the dependent claims or above embodiments with the respective independent claims.

These and other aspects of the invention will be apparent from and elucidated with reference to the embodiments described hereinafter.

DETAILED DESCRIPTION OF EMBODIMENTS

Figure 1:
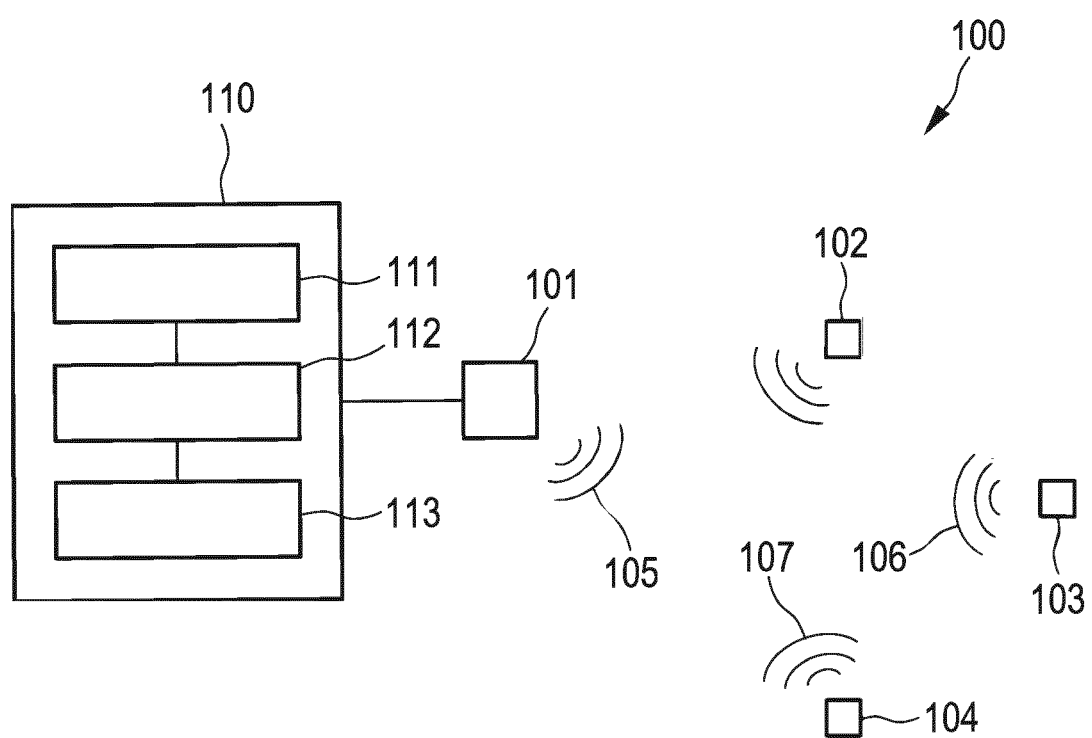
FIG. 1 shows schematically and exemplarily an embodiment of an operation apparatus for operating a network device being part of a network.

FIG. 1 shows schematically and exemplarily an embodiment of an operation apparatus for operating a network device being part of a network. In the following embodiment, the operation apparatus 110 is adapted for operating a network device 101 being, for instance, a lighting module for lighting an environment of the network device. The network device 101 is part of a network 100 comprising, in addition to the network device 101, further network devices 102, 103, 104. In this example the network devices 103, 104 can be regarded as being part of a network neighborhood of network device 101 and can thus be regarded as neighboring network devices. In this case, the network neighborhood of network device 101 is defined by the network devices of the network from which the network device 101 can receive maintenance messages 106, 107 for maintaining the network. In the example provided in FIG. 1, network device 102 is also part of the network but not part of the neighborhood of network device 101, since network device 101 cannot receive maintenance messages sent from network device 101.

The operation apparatus 110 for operating the network device 101 comprises a network information providing unit 111, a determination unit 112 and a control unit 113. In this embodiment, the operation apparatus 110 is directly connected to the network device 101 and, in particular, is provided in the same housing as the network device 101 (not shown).

The network information providing unit 111 is in this case a receiving unit for receiving network information, for instance, from a transceiver of the network device 101 that is adapted to send and receive signals to and from the other network devices 102, 103, 104 of the network 100. The network information received from network information providing unit 111 refers to information with respect to maintenance messages 105, 106, 107 sent and/or received by the network device and/or a neighboring network device 103, 104. The network information received by the network information providing unit 111 can be, for instance, a timing of the sent and received maintenance messages 105, 106, 107 or neighborhood information received from the neighboring network devices, 103, 104, wherein preferably the neighborhood information takes the form of a neighborhood table comprising the identifiers of all network devices being considered as being part of the neighborhood of the network device sending the neighborhood table. After having received the network information, for instance, after having received a maintenance message 106 comprising a neighborhood table from neighboring network device 103, the network information providing unit 111 provides the network information to the determination unit 112.

Determination unit 112 is adapted to determine self-related connection information from the network information provided by the network information providing unit 111. The self-related connection information refers to information on the connection of the network device 101 itself with the network 100. For instance, after having received the network information comprising a neighborhood table of neighboring network device 103, the determination unit 112 can determine or extract all information in the neighborhood table with a relationship to network device 101 itself. In the case of a neighborhood table, the self-related connection information can determine if a network identifier of network device 101 is present in the neighborhood table of neighboring network device 103 indicating that the neighboring network device 103 considers network device 101 as being part of its neighborhood. Additionally, if the determination unit 112 determines that the network identifier of network device 101 is present in the neighborhood table of neighboring network device 103, it can be adapted to further extract connection quality information indicative of a quality of the connection between the network device 101 and the neighboring network device 103 as perceived by the neighboring network device 103 from the neighborhood table.

In another embodiment, the network information can, additionally or alternatively to the neighborhood table, also comprise timing information of the maintenance messages 105, 106, 107 sent and received by a transceiver of network device 101. In this example, the determination unit 112 can be adapted to determine the self-related connection information from the timing information of the sent and received maintenance messages 105, 106, 107. Preferably, the determination unit is adapted to determine as self-related connection information or as part of the self-related connection information a time span since the last sending of a maintenance message 105 by network device 101 itself. If the determined time span is larger than a predetermined threshold, wherein the threshold can be determined, for instance, based on a timing schedule for maintenance messages as provided by a communication protocol used by the network 100, this can indicate that network device 101 has lost its connection to the network 100.

After a determination of the self-related connection information, the control unit 113 uses the self-related connection information for controlling the network device 101. In particular, if the self-related connection information indicates that the network device 101 has lost its connection to the network 100 or runs a risk for losing the connection with the network 100, the control unit can be adapted for controlling the network device 101 such that the network device 101 takes measures to prevent losing of the network connection or to regain the connection to the network 100. In particular, the control unit 113 can be adapted to control the network device 101 such that the network device 101 is reset. The reset can be realized, for instance, by a power-down and a power-up of the network device 101 or of individual parts of the hardware or software of the network device 101. In an example, if the self-related network information indicates that the transceiver of the network device 101 has not sent a maintenance message 105 to the network as scheduled by the maintenance message schedule of the communication protocol of the network 100, the control unit can be adapted for controlling the network device 101 to restart a part of the software controlling the transceiver of the network device 101.

Alternatively, or additionally, the control unit 113 can be adapted to control the network device to provide an information to a user and/or the other network devices 102, 103, 104 if the self-related connection information indicates that the connection of the network device is failing or has failed. For instance, for notifying the user or other network devices, the control unit 113 can be adapted to control the network device 101 to provide a signal like an audio and/or light signal indicating problems with the network connection. Or in case external signal indication is not possible, the network device can update one of its diagnostic attributes, for instance, a diagnostic network protocol stored in the network device, to indicate that the failure has occurred, optionally together with further information on the failure, so that it becomes possible for a user to retrace the failure later. Moreover, if still at least a part of the network connection of the device 101 is available, for instance, if the network device 101 has still the possibility to send a message to at least one of the neighboring network devices 103, 104, the control unit 113 can be adapted to control the network device 101 such that it sends a notification to the at least one of the neighboring network devices 103, 104 to notify the network 100 of its network connection problems. The neighboring network devices 103, 104 can be adapted to detect such a notification from the network device 101 and/or can be adapted to detect a change in the lighting signal of the network device 101 and/or to detect an audio signal of the network device 101. The network devices 102, 103, 104 can then be adapted to react accordingly, for instance, by rearranging a structure of the network 100 like a hierarchical order of the network 100, by searching for new communication routes not including the network device 101, and/or by trying to reconnect the network device 101 to the network 100 by, for instance, increasing a signal intensity of the communication signals of the network 100. Additionally, or alternatively, a user perceiving the notification of the network device 101 can react to the notification of the network device 101 and manually try to reestablish a connection to the network 100, in particular, if at least one try to reestablish a connection to the network 100 by the network device 101 itself has failed indicating, for instance, that some hardware component of the network device 101 might be permanently damaged and might have to be replaced.

Figure 2:
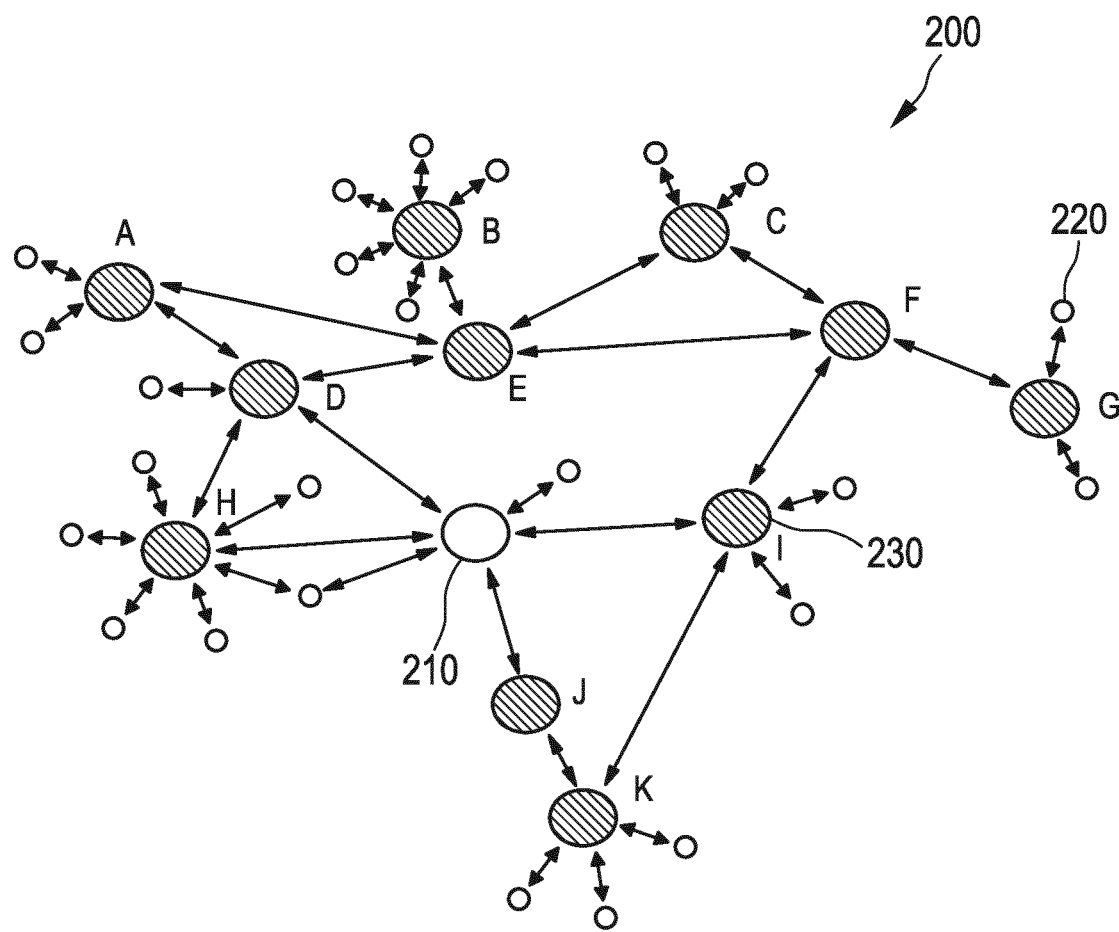
FIG. 2 shows schematically and exemplarily the layout of a network comprising network devices operated by an exemplary operation apparatus.

FIG. 2 shows schematically and exemplarily a network 200 for which an operation apparatus as described above is applicable. The exemplary network 200 uses the Zigbee communication protocol for communication within the network 200. The network 200 comprises, in this example, according to the Zigbee standard, a Zigbee coordinator 210 coordinating the network and a plurality of Zigbee routers 230 indicated in FIG. 2 by alphabetic characters. Moreover, the network 200 comprises a plurality of Zigbee end devices 220 in communication with one of the Zigbee routers 230. In the here described embodiment, the Zigbee coordinator and the Zigbee routers are all provided with an operation apparatus as described above for operating the network devices. To improve the self-healing capability of the Zigbee network 200, the operation apparatus of each of the Zigbee coordinator 210 and the Zigbee routers 230, in particular, the determination unit of the operation apparatuses, will determine a time for when each Zigbee link status message, i.e. maintenance message of the Zigbee standard, has been sent by the respective device. Since the Zigbee end devices 220 have the capability to go into sleep mode, the end devices 220 are not provided with an operation apparatus in this embodiment. Moreover, the operation apparatuses of the Zigbee routers 230 and the Zigbee coordinator 210 will further determine self-related connection information from the received link status messages of neighboring network devices.

For instance, Zigbee router D can receive link status messages from Zigbee routers A, B, E, H and from the Zigbee coordinator 210. Thus, in this example, the Zigbee routers A, B, E, H and the coordinator 210 can be regarded as part of the network neighborhood of Zigbee router D. The determination unit of the operation apparatus of Zigbee router D can then be adapted to randomly choose one of the link status messages received from the Zigbee routers A, B, E, H and the Zigbee coordinator 210 as basis for determining the self-related connection information. For instance, the determination unit can determine from the randomly chosen link status message the connection quality between the Zigbee router D and the randomly chosen neighboring Zigbee router, for instance, Zigbee router A, as a self-related connection information. The control unit of Zigbee router D can then be adapted to determine that Zigbee router D has gone offline or is in the process of going offline if the connection quality as perceived by Zigbee router A is below a predetermined threshold.

Additionally, or alternatively, the control unit of Zigbee router D can be adapted to determine that Zigbee router D has gone offline or is in the process of going offline if the time span since the last sent link status message is beyond a certain threshold, for instance, 5 minutes. In both cases, the control unit can be adapted to control the Zigbee router D to recover itself, for instance, by powering down and powering up again to reconnect to the network 200. Therefore, a problem with the connection to the network 200 can be determined by Zigbee router D itself such that the Zigbee router D itself can take measures to reestablish or maintain a connection with network 200. This increases the self-healing capabilities of the Zigbee network 200.

Figure 3:
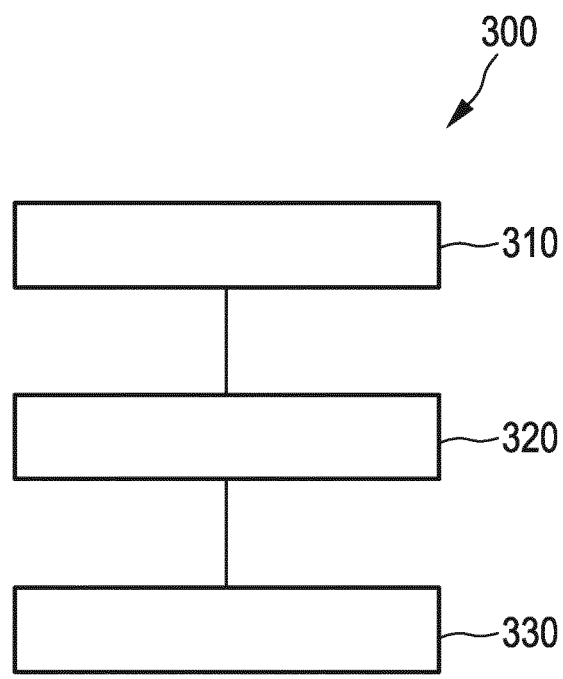
FIG. 3 shows a flow chart exemplarily illustrating an embodiment of a method for operating a network device.

In the following, an embodiment of a method 300 for operating a network device 101 being part of the network 100 will be described with reference to a flow chart shown in FIG. 3. The operating method 300 comprises a first step 310 of providing network information, wherein the network information comprises information with respect to maintenance messages 105, 106, 107 sent by the network device 101 and/or a neighboring network device 103, 104 of the network device 101 to maintain the network 100. In a second step 320, self-related connection information is determined from the network information, wherein the self-related connection information refers to information on the connection of the network device 101 itself with a network 100. Based on the self-related connection information, the method 300 then comprises, in step 330, controlling the network device 101. In particular, the controlling of the network device 101 can comprise resetting the network device 101, for instance, by powering down and powering up the network device 101.

For wireless networks, comprising a plurality of network devices, one of the important challenges is to ensure that the network is self-healing and that the communication continues without any major issues. To this end, mesh network stack implementations, such as Zigbee stack implementations, ensure that information about all neighboring network devices of a network device are updated at regular intervals. This leads to a network that is resilient in nature. In particular, since the information about all the neighboring network devices is known to each network device, alternative routes for communication from one network device to another network device can be found very easily. However, the self-healing behavior of the network is mainly based on detecting the failure of neighboring network devices, whereas a network device is not able to detect if itself is not reachable by other network devices. Therefore, this invention is focused on an operation apparatus, a method and a computer program that allow a network device to determine by itself if it has problems with the connection to the network.

For instance, the invention allows a network device that is still powered-on but is not reachable by other network devices to detect this problem itself, for example, by regularly checking whether a maintenance message maintaining the network, in particular, that is used for creating and maintaining the neighborhood table of neighboring network devices, has been sent out or not according to a schedule. In an exemplary embodiment, lighting devices are connected wirelessly in a mesh network. The mesh network uses neighborhood tables for maintaining the current network and for updating new network devices into the network and for removing non-reachable network devices from the network. In particular, maintenance messages, for instance, regular data messages or event messages without any data are used by the network devices to update their neighborhood tables. The network devices can then monitor their own maintenance messages sent for maintaining the neighborhood tables in their neighboring network devices. Alternatively, or additionally, the network devices can also check whether the neighborhood table of the neighboring device comprises the identifier of the network device itself such that the neighborhood network device regards the network device as part of its neighborhood.

Generally, any network device able of wireless communication comprises a transceiver for transmitting and receiving messages, for instance, radio messages. In most wireless based networks, each network device that does not enter into a sleep mode, in case of a Zigbee network, especially the Zigbee router and the Zigbee coordinator, keeps sending maintenance messages to keep the network alive at all times. Based on these maintenance messages, in most networks the network devices maintain a neighborhood table identifying all network devices being part of a network neighborhood of the network device. For instance, in Zigbee applications, link status messages are sent at regular intervals to all the network devices in the nearest vicinity, i.e. with hub count one. In case of Zigbee applications, a link status message contains network addresses, i.e. network identifiers, of all the neighboring network devices of the network device sending the link status message and incoming/outcoming link quality information, i.e. connection quality data. More information on the details of the link status messages in Zigbee communication protocols can be found, for instance, in section 3.4.8 of the ZigBee specification, version Dec. 16, 2014.

In case of Zigbee networks, link status messages are sent regularly, such as every few seconds, particularly every 15 to 30 seconds, for instance, to notify the presence of a network device to other network devices of the network. In an embodiment of the proposed invention, the wireless message stack, for instance, processed by the operation apparatus, makes a note of the sending time of the last regular maintenance message, for instance, in case of Zigbee, of the link status message.

Moreover, in an embodiment of the proposed invention, every network device, in particular, an operation apparatus being part of the network device, monitors its own entry, i.e. network identifier, in the neighborhood table in the received maintenance messages of neighboring network devices on a random basis to ensure that not the maintenance message of the same neighboring network device is monitored all the time. In particular, the network device, in particular, the operation apparatus of the network device, can be configured to monitor the regular maintenance messages and not just to add or remove neighboring network devices, but also to look for its own entry, i.e. network identifier, in the maintenance message. If the entry is present, link quality indicators, i.e. connection quality data, can be taken into consideration to judge how well the network device is considered reachable by neighboring network devices. If the link quality indicators for the network device as determined from a plurality of neighboring network devices are above a threshold, for instance, in case of Zigbee, above 180 out of 255, the network device can consider itself healthy. If the link quality indicator for this network device shows a degradation over a period of time in the view of at least one neighboring device, the network device itself can notice that it is in the process of going offline, i.e. failing.

The same general principles can be implemented in a Zigbee stack or a Bluetooth low energy (BLE) stack to improve the self-healing capabilities of a network. Moreover, also a stack used in the Star Sense wireless solution can be adapted based on the above principles. In case of a Star Sense radio frequency stack, the maintenance messages, i.e. beacons, are sent every 90 seconds to enable the maintenance of the neighborhood table, i.e. network table, in the network.

Although in the above embodiments the invention was mainly explained based on a Zigbee network, the network can also use other network communication protocols, like, for instance, the Star Sense communication protocol, a BLE mesh communication protocol, a 6LoWPAN communication protocol, etc. Moreover, although in the above embodiments the network devices comprise lighting units to fulfill lighting functions, in other embodiments the network devices can provide other functions, like, for instance, sensor functions, entertainment functions, environmental manipulation functions etc.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of the network information, the determination of the self-related connection information and the controlling of a network device, performed by one or several units or devices can be performed by any other number of units or devices. For instance, these procedures can be carried out by a single device. These procedures can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless communication systems.

Any reference signs in the claims should not be construed as limiting the scope.

The present invention refers to providing an apparatus that allows for improving the self-healing capability of a network, wherein the apparatus is adapted to be part of a network, like a Zigbee network. The operation apparatus is adapted to operate a network device and comprises a network information providing unit, wherein the network information refers to information with respect to maintenance messages sent and/or received by a network device and/or a neighboring network device to maintain the network, a determination unit for determining self-related connection information from the network information, wherein the self-related connection information refers to information on the connection of the network device itself with the network, and a control unit for controlling the network device based on the self-related connection information.

The invention claimed is:

1. Operation apparatus for operating a network device adapted to being part of a network comprising a plurality of network devices, wherein the operation apparatus comprises:
    a network information provider for providing network information, wherein the network information refers to information with respect to maintenance messages sent and/or received by the network device and/or a neighboring network device of the network device to maintain the network, wherein the neighboring network device is part of the same network as the network device,
    a determinator for determining self-related connection information from the network information, wherein the self-related connection information refers to information on the connection of the network device itself with the network,
    a controller for controlling the network device based on the self-related connection information,
    wherein the network information comprises neighborhood information indicative of a network neighborhood of a neighboring network device being part of the network neighborhood of the network device, and wherein the determinator is adapted to determine self-related connection information from the neighborhood information,
    wherein the determinator is adapted to determine from the neighborhood information an indication whether the network device is known by the neighboring network device to belong to the neighborhood of the neighboring network device as self-related connection information,
    wherein the controller is adapted to control the network device to take measures for reconnecting to the network if the self-related connection information indicates that the connection of the network device to the network is failing, and
    wherein the self-related connection information determined from the network information comprises information indicative of a timing of maintenance messages sent by the network device itself.

2. The operation apparatus according to claim 1, wherein the neighborhood information comprises connection quality data being indicative of a quality of a network connection between two network devices, wherein the determinator is adapted to determine self-related connection information from the connection quality data.

3. The operation apparatus according to claim 1, wherein the determinator is adapted to determine self-related connection information from the neighborhood information of a randomly chosen neighboring network device.

4. The operation apparatus to claim 1, wherein the neighborhood information comprises a neighborhood table that contains identifiers of all network devices considered to be part of the neighborhood of the network device sending the neighborhood table.

5. The operation apparatus according to claim 1, wherein the controller is adapted to control the network device to provide an information to a user and/or other network devices that a connection to the network is failing if the self-related connection information indicates that the connection of the network device is failing.

6. The operation apparatus according to claim 1, wherein the network is a ZigBee network and the network device is adapted to be part of the ZigBee network.

7. A network device adapted to being part of a network of a plurality of network devices, and comprising the operation apparatus for operating the network device, wherein the operation apparatus comprises:
    a network information provider for providing network information, wherein the network information refers to information with respect to maintenance messages sent and/or received by the network device and/or a neighboring network device of the network device to maintain the network, wherein the neighboring network device is part of the same network as the network device,
    a determinator for determining self-related connection information from the network information, wherein the self-related connection information refers to information on the connection of the network device itself with the network,
    a controller for controlling the network device based on the self-related connection information,
    wherein the network information comprises neighborhood information indicative of a network neighborhood of a neighboring network device being part of the network neighborhood of the network device, and wherein the determinator is adapted to determine self-related connection information from the neighborhood information,
    wherein the determinator is adapted to determine from the neighborhood information an indication whether the network device is known by the neighboring network device to belong to the neighborhood of the neighboring network device as self-related connection information,
    wherein the controller is adapted to control the network device to take measures for reconnecting to the network if the self-related connection information indicates that the connection of the network device to the network is failing, and
    wherein the self-related connection information determined from the network information comprises information indicative of a timing of maintenance messages sent by the network device itself.

8. the network device of claim 7 comprising at least one network device, where in the at least one network device adapted to being part of the network of the plurality of network devices.

9. Operation method for operating a network device adapted to being part of a network comprising a plurality of network devices, wherein the operation method comprises:

providing network information, wherein the network information comprises information with respect to maintenance messages sent by the network device and/or a neighboring network device of the network device to maintain the network, wherein the neighboring network device is part of the same network as the network device, determining self-related connection information from the network information, wherein the self-related connection information refers to information on the connection of the network device itself with the network, controlling the network device based on the self-related connection information, wherein the network information comprises neighborhood information indicative of a network neighborhood of a neighboring network device being part of the network neighborhood of the network device, and wherein the determining comprises determining self-related connection information from the neighborhood information, wherein the determining comprises determining from the neighborhood information an indication whether the network device is known by the neighboring network device to belong to the neighborhood of the neighboring network device as self-related connection information, and wherein the controlling the network device comprises controlling the network device to take measures for reconnecting to the network if the self-related connection information indicates that the connection of the network device to the network is failing, and wherein the self-related connection information determined from the network information comprises information indicative of a timing of maintenance messages sent by the network device itself.

10. A non-transitory computer readable medium for operating a network device, wherein the non-transitory computer readable medium comprising executable instructions that, when executed by an operation apparatus to perform providing network information, wherein the network information comprises information with respect to maintenance messages sent by the network device and/or a neighboring network device of the network device to maintain the network, wherein the neighboring network device is part of the same network as the network device, determining self-related connection information from the network information, wherein the self-related connection information refers to information on the connection of the network device itself with the network, controlling the network device based on the self-related connection information, wherein the network information comprises neighborhood information indicative of a network neighborhood of a neighboring network device being part of the network neighborhood of the network device, and wherein the determining comprises determining self-related connection information from the neighborhood information, wherein the determining comprises determining from the neighborhood information an indication whether the network device is known by the neighboring network device to belong to the neighborhood of the neighboring network device as self-related connection information, and wherein the controlling the network device comprises controlling the network device to take measures for reconnecting to the network if the self-related connection information indicates that the connection of the network device to the network is failing, and wherein the self-related connection information determined from the network information comprises information indicative of a timing of maintenance messages sent by the network device itself.

11. Operation apparatus for operating a network device adapted to being part of a network comprising a plurality of network devices, wherein the operation apparatus comprises:

a network information provider for providing network information, wherein the network information refers to information with respect to maintenance messages sent and/or received by the network device and/or a neighboring network device of the network device to maintain the network, wherein the neighboring network device is part of the same network as the network device, a determinator for determining self-related connection information from the network information, wherein the self-related connection information refers to information on the connection of the network device itself with the network, a controller for controlling the network device based on the self-related connection information, wherein the network information comprises neighborhood information indicative of a network neighborhood of a neighboring network device being part of the network neighborhood of the network device, and wherein the determinator is adapted to determine self-related connection information from the neighborhood information, wherein the determinator is adapted to determine from the neighborhood information an indication whether the network device is known by the neighboring network device to belong to the neighborhood of the neighboring network device as self-related connection information, wherein the controller is adapted to control the network device to take measures for reconnecting to the network if the self-related connection information indicates that the connection of the network device to the network is failing, and wherein the self-related connection information determined from the network information comprises a time span since the last maintenance message has been sent by the network device itself, wherein the control unit controller is adapted to compare the determined time span with a predetermined threshold and to control the network device based on the result of the comparison.

12. The operation apparatus according to claim 11, wherein the neighborhood information comprises connection quality data being indicative of a quality of a network connection between two network devices, wherein the determinator is adapted to determine self-related connection information from the connection quality data.

13. The operation apparatus according to claim 11, wherein the determinator is adapted to determine self-related connection information from the neighborhood information of a randomly chosen neighboring network device.

14. The operation apparatus to claim 11, wherein the neighborhood information comprises a neighborhood table that contains identifiers of all network devices considered to be part of the neighborhood of the network device sending the neighborhood table.

15. The operation apparatus according to claim 11, wherein the controller is adapted to control the network device to provide an information to a user and/or other network devices that a connection to the network is failing if the self-related connection information indicates that the connection of the network device is failing.

16. The operation apparatus according to claim 11, wherein the network is a ZigBee network and the network device is adapted to be part of the ZigBee network.

17. A network device adapted to being part of a network of a plurality of network devices, and comprising the operation apparatus according to claim 11 for operating the network device, wherein the operation apparatus comprises:
 a network information provider for providing network information, wherein the network information refers to information with respect to maintenance messages sent and/or received by the network device and/or a neighboring network device of the network device to maintain the network, wherein the neighboring network device is part of the same network as the network device,
 a determinator for determining self-related connection information from the network information, wherein the self-related connection information refers to information on the connection of the network device itself with the network,
 a controller for controlling the network device based on the self-related connection information,
 wherein the network information comprises neighborhood information indicative of a network neighborhood of a neighboring network device being part of the network neighborhood of the network device, and wherein the determinator is adapted to determine self-related connection information from the neighborhood information,
 wherein the determinator is adapted to determine from the neighborhood information an indication whether the network device is known by the neighboring network device to belong to the neighborhood of the neighboring network device as self-related connection information,
 wherein the controller is adapted to control the network device to take measures for reconnecting to the network if the self-related connection information indicates that the connection of the network device to the network is failing, and
 wherein the self-related connection information determined from the network information comprises a time span since the last maintenance message has been sent by the network device itself, wherein the control unit controller is adapted to compare the determined time span with a predetermined threshold and to control the network device based on the result of the comparison.

18. the network device of claim 17 comprising at least one network device, wherein the at least one network device adapted to being part of the network of the plurality of network devices.

* * * * *